(12) United States Patent
Kinkead

(10) Patent No.: US 10,118,629 B2
(45) Date of Patent: Nov. 6, 2018

(54) HIGH SPEED TRANSPORTATION SYSTEM

(71) Applicant: Jordan Kinkead, Kentfield, CA (US)

(72) Inventor: Jordan Kinkead, Kentfield, CA (US)

( * ) Notice: Subject to any disclaimer, the term of this patent is extended or adjusted under 35 U.S.C. 154(b) by 0 days.

(21) Appl. No.: 15/686,115

(22) Filed: Aug. 24, 2017

(65) Prior Publication Data
US 2018/0057019 A1    Mar. 1, 2018

Related U.S. Application Data

(60) Provisional application No. 62/379,703, filed on Aug. 25, 2016.

(51) Int. Cl.
*B61B 9/00* (2006.01)
*B61B 12/00* (2006.01)
*B61B 12/12* (2006.01)

(52) U.S. Cl.
CPC .............. *B61B 9/00* (2013.01); *B61B 12/007* (2013.01); *B61B 12/125* (2013.01)

(58) Field of Classification Search
CPC .... B61B 7/00; B61B 7/02; B61B 7/06; B61B 9/00; B61B 13/00; B61B 13/12
See application file for complete search history.

(56) References Cited

U.S. PATENT DOCUMENTS

| 362,634 A | 5/1887 | Johnson |
| 3,871,303 A * | 3/1975 | Woodling ................. B61B 1/02 |
| | | 104/168 |
| 4,092,929 A | 6/1978 | Laurent |
| 4,848,241 A * | 7/1989 | Kunczynski .............. B61B 7/04 |
| | | 104/173.1 |
| 5,419,261 A | 5/1995 | Tarasoff et al. |
| 5,517,923 A * | 5/1996 | Cathiard ................... B61B 9/00 |
| | | 104/173.1 |
| 6,182,577 B1 | 2/2001 | Billings |
| 8,418,625 B2 | 4/2013 | Czaloun |
| 2010/0180792 A1 | 7/2010 | Bavaresco et al. |

OTHER PUBLICATIONS

U.S. International Searching Authority, International Search Report and Written Opinion of the International Searching Authority, Int'l App. No. PCT/US 17/48511, dated Nov. 21, 2017.

* cited by examiner

*Primary Examiner* — Robert J McCarry, Jr.

(74) *Attorney, Agent, or Firm* — The Hecker Law Group, PLC

(57) ABSTRACT

High speed rail transportation systems are provided for improving transportation costs, speed and convenience for passengers, owners and operators. The high speed rail transportation system may include a high speed propulsion segment assembly, a segment of rails and a load station for transporting vehicles independent from each other and at high speed. In an embodiment, the high speed propulsion segment assembly may include a propulsion cylinder, a free cylinder and a cable assembly movably connected to the propulsion cylinder and the free cylinder.

20 Claims, 9 Drawing Sheets

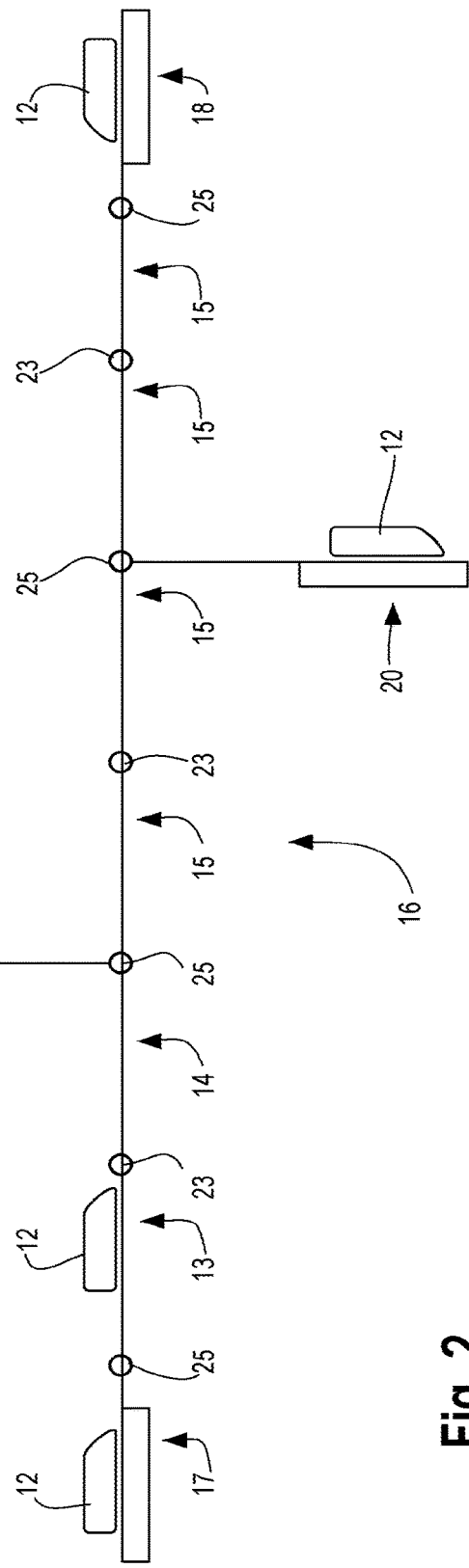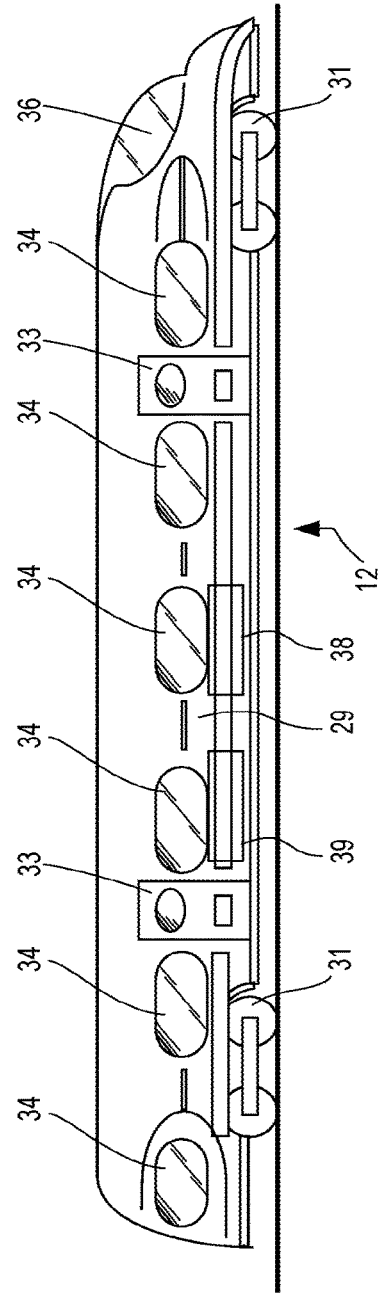

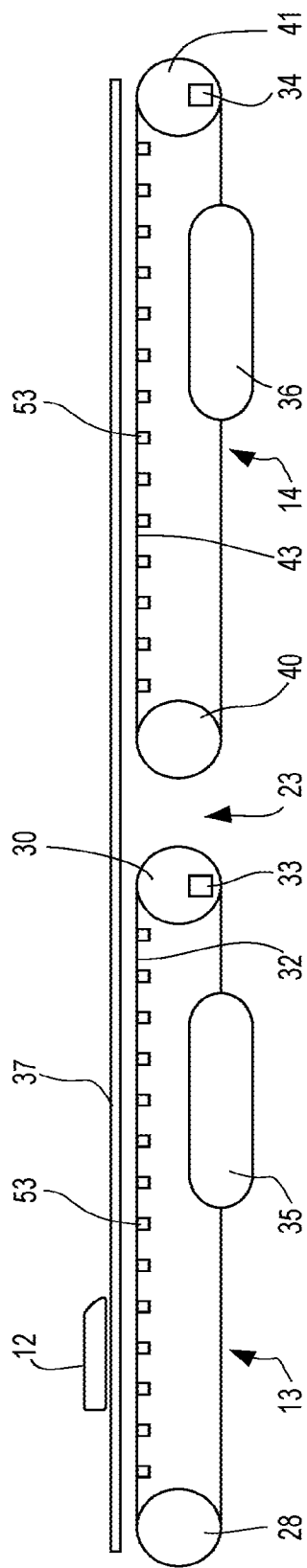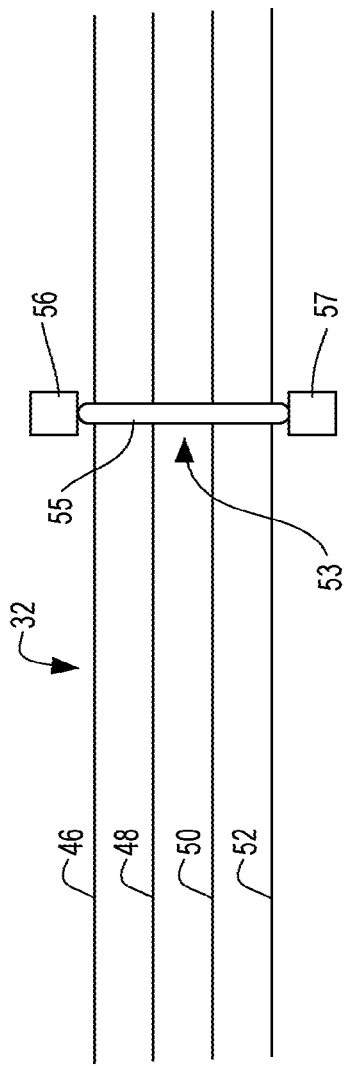

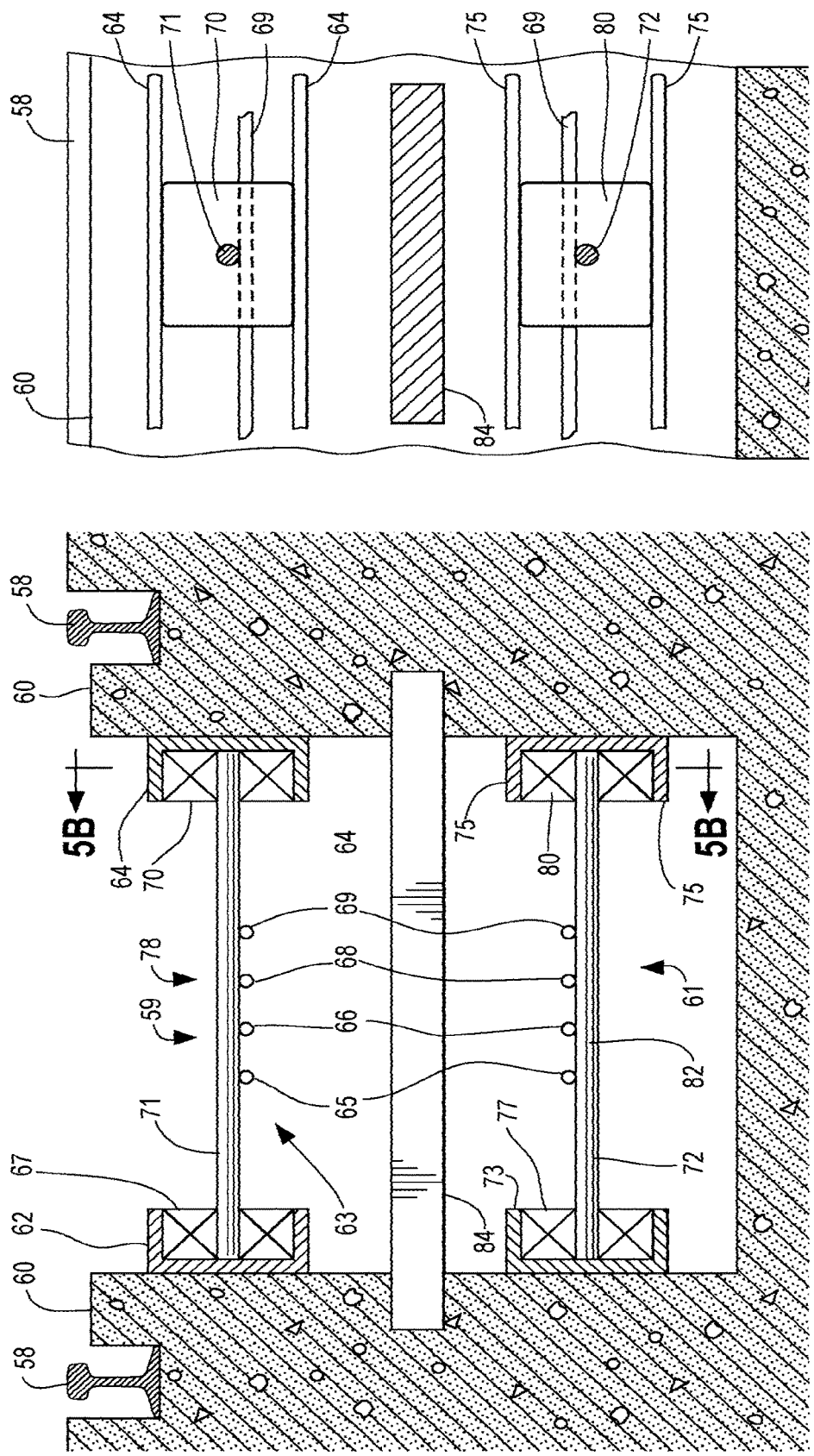

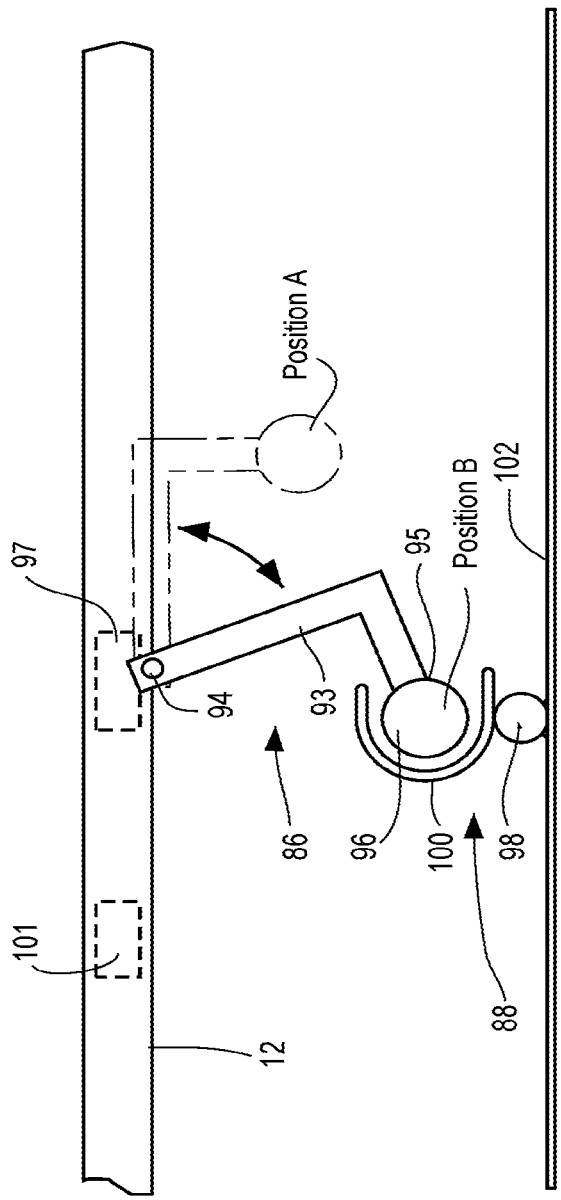

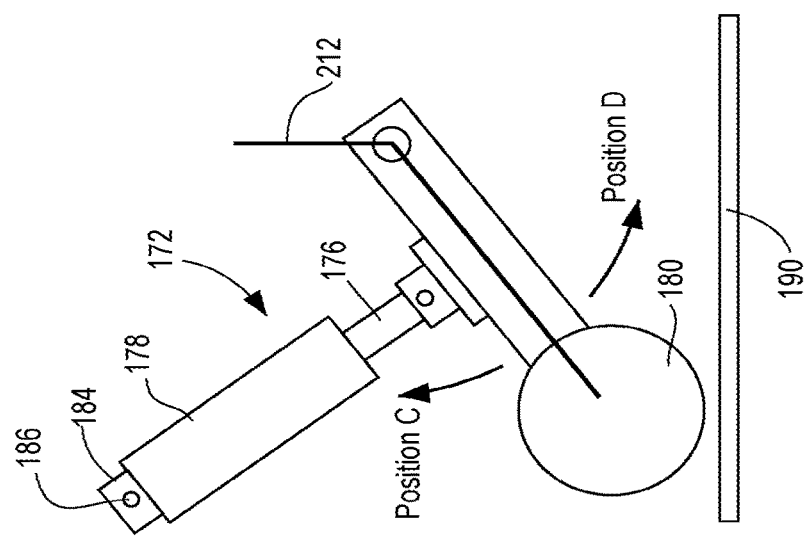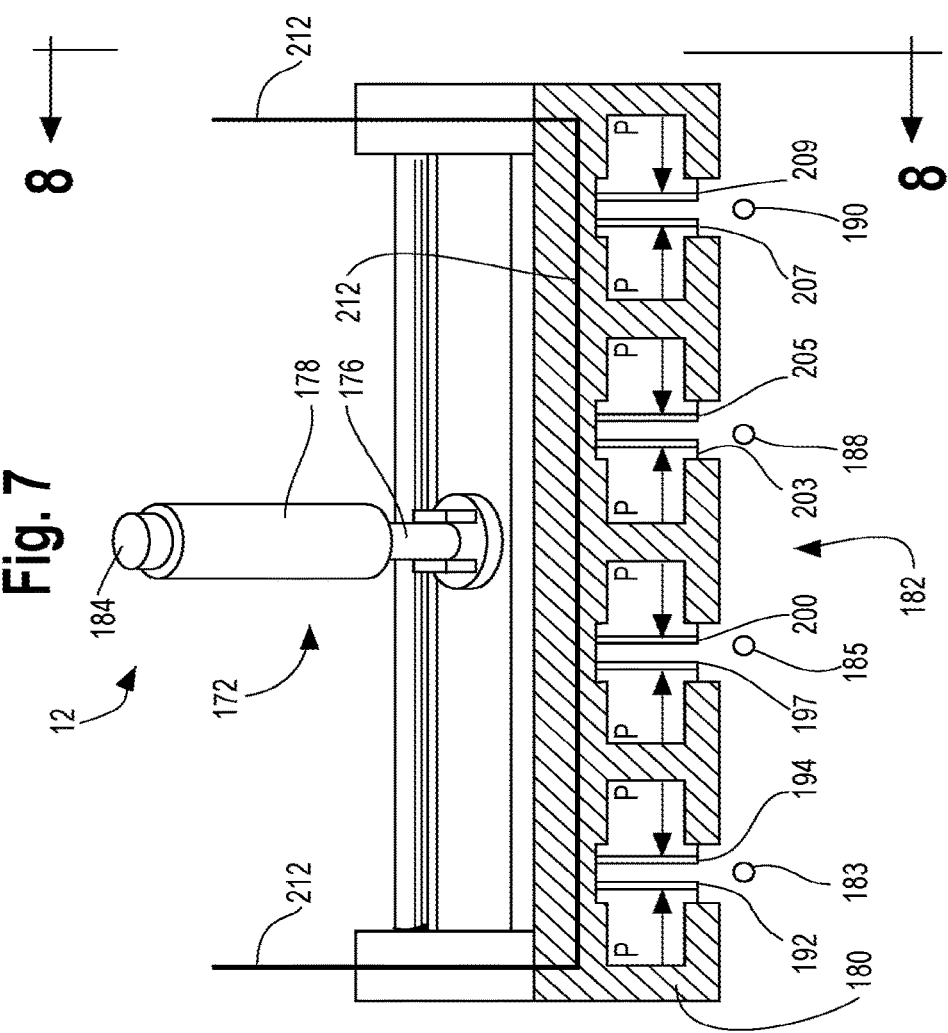

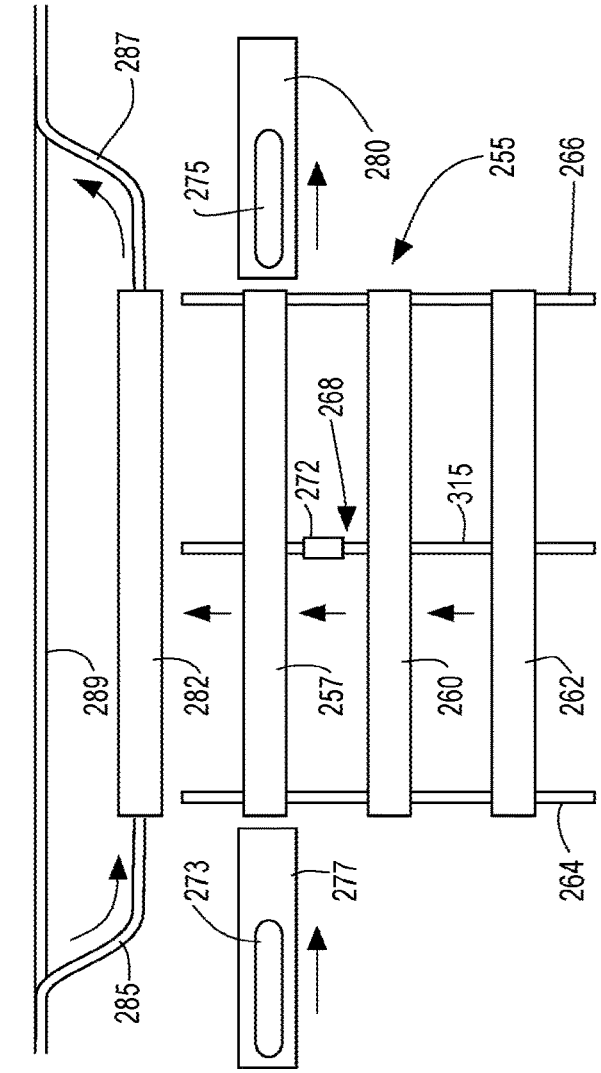
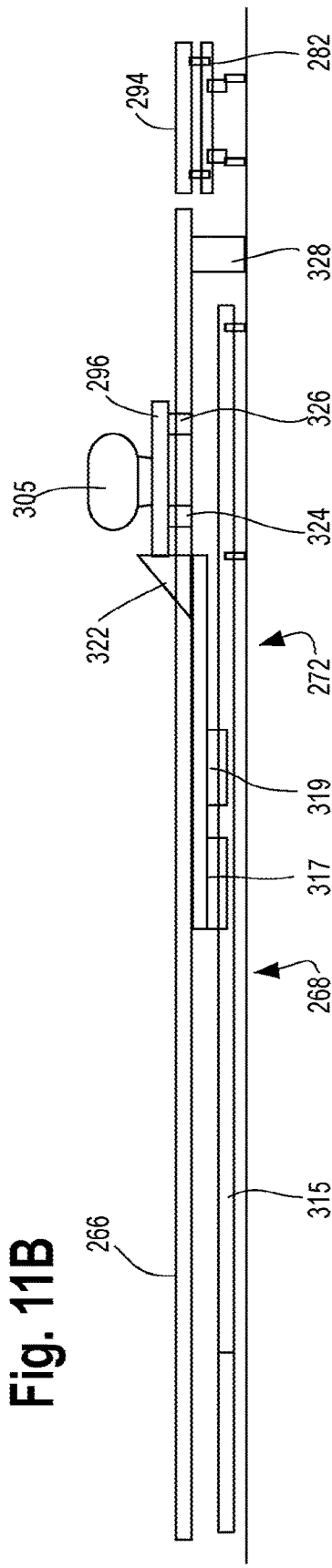
Fig. 11A
Fig. 11B

HIGH SPEED TRANSPORTATION SYSTEM

CROSS-REFERENCE TO RELATED APPLICATIONS

This patent application claims the benefit of the filing date of U.S. Provisional Patent Application Ser. No. 62/379,703 for "HIGH SPEED TRANSPORTATION SYSTEM" filed on Aug. 25, 2016 which is incorporated by reference in its entirety herein.

FIELD OF THE INVENTION

The present invention in general relates to the field of transportation systems, and more particularly to a high volume, high speed rail transportation system for improving transportation costs, speed and convenience for passengers, owners and operators.

BACKGROUND OF THE INVENTION

There is no admission that the background art disclosed in this section legally constitutes prior art.

There have been many attempts at building mass transportation systems, one of which is the current rail transportation system. Currently, rail travel consists of train engines (locomotives) pulling (or pushing) a number of rail cars. A conventional rail car may weigh around 110,000 pounds, and the locomotive car may weigh around 200,000 pounds. Thus, a typical train set consisting of a locomotive and eight cars may weigh over 1,000,000 pounds. This amount of weight requires supporting infrastructure that is heavy and expensive to build and maintain.

Conventional train systems have certain inefficiencies regarding fuel economy. One inefficiency is that a conventional train set must not only provide power through a diesel or electric motor to move the cars, but must also provide power to move the source of the power, i.e., the locomotive. Another inefficiency exists because a great deal of energy is used to start and stop the entire set of train cars each time it leaves from or arrives at a station, even if only a few passengers are embarking or disembarking from the train.

Moreover, because the coefficient of friction between the locomotive's steel wheels and the steel rails is small, the locomotive must be quite heavy (in relation to the cars) in order to provide the necessary traction to move itself and the cars. Furthermore, because conventional trains must make many stops, the train must be designed to travel at a higher speed in order to meet a desired average speed. For example, there are conventional high speed rail systems that are designed for and travel at speeds of over 200 mph so that with all of the required stops, the train can average around 130 mph. Also, if a conventional train is involved in an accident, this could involve many cars and endanger several hundred passengers. Another drawback relates to the significant amount of noise pollution that high speed trains create when traveling at speeds over 200 mph, particularly when the trains are exiting tunnels.

Further, conventional rail systems are limited in the amount of grade that the locomotive can traverse, thus requiring designs that maximize the amount of level tracks. Typically, designs around steep grades (e.g., a mountain pass) involve building additional track to go around the obstruction or a tunnel to pass through the obstruction, with both options adding significant costs to the system.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 1 is a pictorial diagrammatic view of a high speed transportation system which is constructed in accordance with an embodiment;

FIG. 2 is a side view of one of the plurality of high speed vehicles of the transportation system of FIG. 1;

FIG. 3 is a diagrammatic view of the high speed propulsion segment assembly for the transportation system of FIG. 1;

FIG. 4 is a top sectional view of a cable assembly and a cable support apparatus in accordance with an embodiment;

FIG. 5A is a rear cutaway view of a support structure for the cable assembly and cable support apparatus of FIG. 4;

FIG. 5B is a side cutaway view of the support structure of FIG. 5A;

FIG. 6 is a side cutaway view of a vehicle connector assembly and a cable support apparatus in accordance with an embodiment;

FIG. 7 is a rear cutaway view of a vehicle connector assembly in accordance with another embodiment;

FIG. 8 is a side cutaway view of the vehicle connector assembly of FIG. 7;

FIG. 11A is a top view of a road vehicle loading system in accordance with an embodiment of the transportation system of FIG. 1;

FIG. 11B is a side view of the road vehicle loading system of FIG. 11A;

DETAILED DESCRIPTION OF CERTAIN EMBODIMENTS OF THE INVENTION

Figure 9:
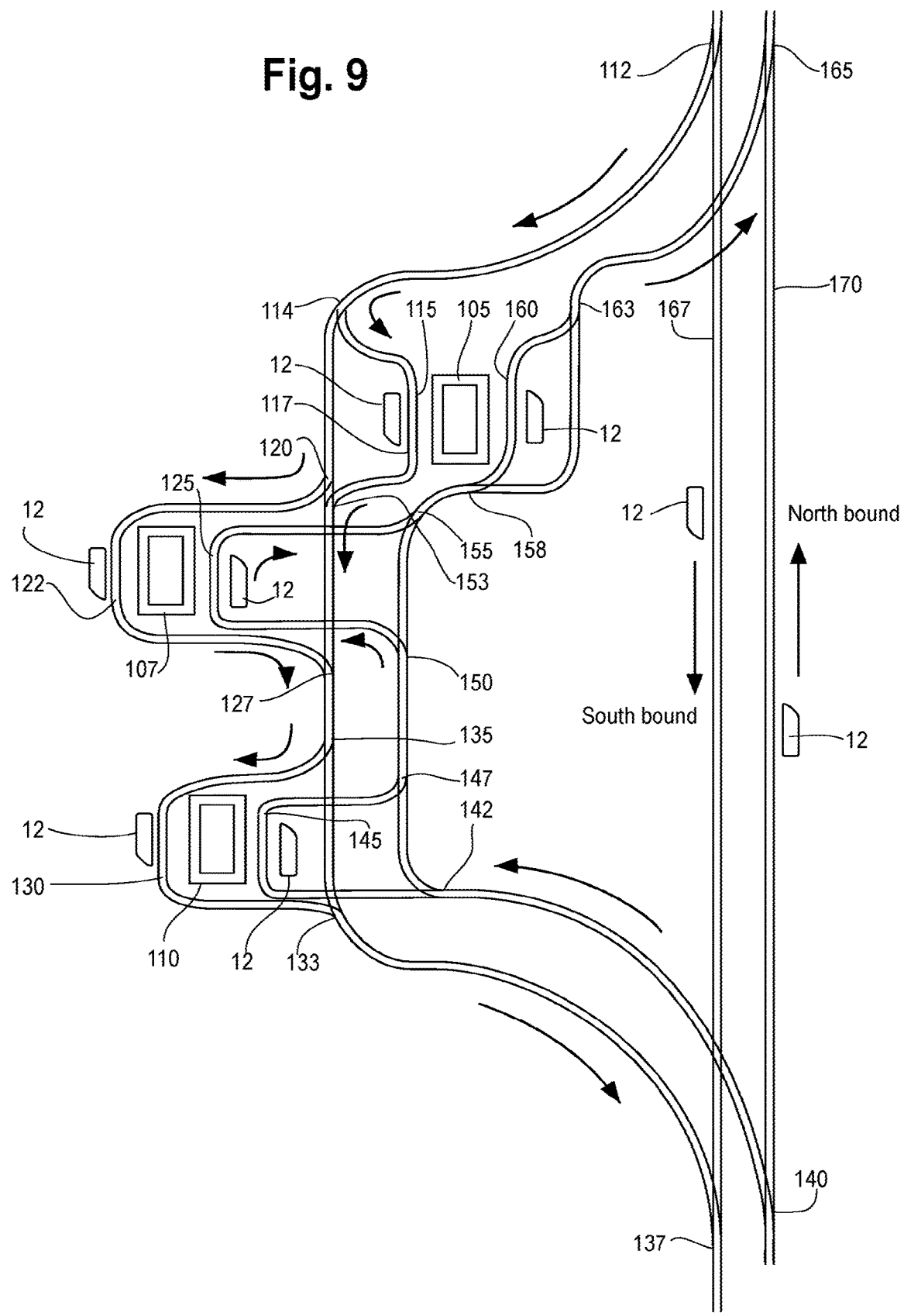
FIG. 9 is a top diagrammatic view of multiple secondary stations in accordance with an embodiment of the transportation system of FIG. 1.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

High speed rail transportation systems that improve efficiency, volume and convenience and for passengers and cost less to build and run are disclosed. The transportation system includes a high speed propulsion segment assembly for transporting high speed vehicles over rails. The high speed propulsion segment assembly may include a cable assembly that is looped between a propulsion cylinder and a free cylinder. The high speed rail transportation system of the present invention would require a much lighter infrastructure and cost significantly less than conventional high speed transportation systems.

Referring now to the drawings, and more particularly to FIG. 1 thereof, there is shown a pictorial view of a high speed rail transportation system 10, which is constructed in accordance with an embodiment. The transportation system 10 includes one or more high speed propulsion segment assemblies, such as high speed propulsion segment assembly 13 operationally coupled to a load station 17 for transporting a vehicle 12 over rails at high speed. The high speed propulsion segment assembly 13 is also operationally coupled to a second high speed propulsion segment assembly 14, which is substantially similar to propulsion assembly 13. High speed propulsion segment assembly 14 is further coupled to additional high speed propulsion assemblies 15 to form a high speed propulsion system 16. The additional high speed propulsion segment assemblies 15 are substantially similar to propulsion assembly 13.

At the opposite end from the first load station 17, the high speed propulsion system 16 is operationally coupled to a second load station 18, which is substantially similar to the first load station 17 and may also be located in a large city for example. The transportation system 10 may include the high speed propulsion system 16 that is designed to propel the vehicle 12 between the first load station 17, the second load station 18, a third load station 19 and a fourth load station 20 over a mainline rail track and a station rail track. Further, each of the high speed propulsion segment assemblies may be connected to each other through a segment transition zone 23 in order to form the high speed propulsion system 16. The segment transition zones 23 are zones of travel for the vehicles that link one segment assembly with another segment assembly. Because the seamless movement of the vehicle 12 between each of the high speed propulsion assemblies, the rail system 10 operates as a continuous track.

The load stations 17, 18, 19 and 20 may be substantially similar in that all of the load stations provide access for the loading and unloading of passengers and other cargo. In an embodiment, the load stations 17, 18, 19 and 20 may be around 100 feet in length which corresponds to an approximate length of a vehicle 12 and which is long enough to allow an individual vehicle to embark and disembark passengers. Because the high speed rail system 10 provides for flexible transportation of individual vehicles 12, the vehicles may wait in a load station for an extended time period, for example 15 minutes, while passengers that are proceeding to a specific destination embark on the vehicle along with their luggage at a less rushed pace than conventional systems.

Each of the load stations 17, 18, 19 and 20 are connected to the high speed propulsion system 16 through a load station transition zone 25. The load station transition zones 25 are zones of travel for the vehicles that link a segment assembly with tracks leading to a load station for passengers. In operation, the vehicles 12 may be scheduled to travel from one particular load station to another load station. For example, a passenger may start out by embarking on a high speed vehicle 12 at the first load station 17 that is scheduled to travel through the high speed propulsion system 16 to the second load station 18, the third load station 20 or the fourth load station 21. Upon reaching the destination load station, the passenger can disembark from the vehicle 12 and continue on to their final destination via other modes of transportation such as walking, bicycle, automobile, taxi or bus.

In an embodiment, load stations 17 and 18 may be located in a large city while load stations 19 and 20 may be located in smaller cities or towns. Conventional passenger rail systems require the entire train to stop and restart at each station whether or not all passengers need to embark or disembark. In contrast, the high speed rail system 10 allows a passenger to travel from station 17 to station 18, station 19 or station 20 directly. Further, a passenger traveling from station 17 to station 18 is not required to stop at either station 19 or station 20 to pick up or drop off additional passengers. The scheduling for the high speed rail system 10 provides for more selective loading, scheduling and stopping of individual vehicles 12 at stations in order to maximize efficiency in terms of time and energy for the system and the passengers.

Further, conventional rail systems typically rarely travel at an average speed that is much lower than the higher design speed. Conventional systems must be designed for higher speeds, such as 200 miles per hour (mph) to account for all of the many stops and slow sections of travel. Because the high speed rail system 10 requires that only the specific vehicle 12 that reaches a desired destination to exit and stop, the rail system 10 may be designed at a lower top end speed than that of conventional systems. In an embodiment, the high speed rail system 10 provides a system where the typical vehicle may only have a top end speed of around 120-125 mph, which uses considerably less energy than conventional systems that may travel at around 200 mph. But because of the increased efficiencies of the high speed rail system 10 during operation, vehicles 12 may reach their destination in the same or faster average speed as conventional system trains.

In the embodiment shown in FIG. 1, each of the high speed propulsion assemblies may be approximately 5 miles in length. In this example, there are a total of six high speed propulsion assemblies coupled between the load station 17 and the load station 18, which provides a total distance of the high speed propulsion system 16 that is approximately 30 miles. In other embodiments, any number of high speed propulsion assemblies may be coupled together in order to provide a system 10 that spans greater distances.

Referring now to FIG. 2, there is shown a high speed vehicle 12 in accordance with an embodiment. The vehicle 12 is aerodynamic in form and may include a main body 29 that has one or more sets of wheels 31 for rolling on train tracks. The vehicle 12 may also include one or more doors 33 for allowing passengers to enter and exit the vehicle 12. The vehicle may include one or more side windows 34 and a cab window 36 may be located at either or both ends of the vehicle 12. The vehicle 12 may also have a small on-board generator 38 that is coupled to the axles of the vehicle 12 so that electric power may be produced by the generator 38 when the axles are turning. The energy created by generator 38 can then be used to power ancillary components such as brakes, lighting or HVAC systems for the vehicle 12.

In an embodiment, the vehicle 12 may weigh approximately 35,000 pounds, have a length of approximately 80 feet, and have a height above the rails of approximately 11 feet. The vehicle 12 may have the capacity to carry up to approximately 100 passengers and their luggage. In addition, the vehicle 12 may include numerous amenities such as plush seating for all passengers, food, bathrooms, tables and communications equipment and services. In an embodiment, the vehicle 12 may include a small motor 39 that can accelerate the vehicle 12 up to around 10-20 mph when leaving a station until engaging an accelerating system in a load station transition zone. Once engaged to the accelerating system, the vehicle 12 may accelerate up to approximately 125 mph in order to connect with a mainline track. Once operating on a mainline track at around 125 mph, the vehicle 12 may coast and gradually decelerate to approximately 120 mph to match the speed of the high speed propulsion segment assembly before engagement. In an embodiment, there may be a shock absorption system incorporated on the vehicle 12 (not shown) in order to reduce any the effects of any jolts or other unwanted movements during an engagement.

The vehicle 12 may be operated with or without an attendant, but an attendant may be located at a load station. The attendant may perform services such as managing ticket sales, cleaning the vehicles and the load stations and be available for emergency situations.

Referring now to FIG. 3, there is shown a side view of a high speed propulsion segment assembly 13 for the transportation system 10 according to an embodiment. The high speed propulsion segment assembly 13 includes a cable assembly 32 that is looped continuously between a propulsion cylinder 30 and a free cylinder 28. The cable assembly 32 is located below the rail tracks 37 so as to connect to and propel a vehicle 12.

Also shown in FIG. 3 is a high speed propulsion segment assembly 14 that includes cable assembly 43 that is looped continuously between a propulsion cylinder 41 and a free cylinder 40. A segment transition zone 23 is shown between the propulsion segment assembly 13 and the propulsion segment assembly 14. The propulsion segment assembly 13 may include a motor 33 that powers the propulsion cylinder 30. The propulsion segment assembly 13 may also include a tensioner 35 for reducing or eliminating the slack in the cable assembly 32. Similarly, the propulsion segment assembly 14 may include a motor 34 that powers the propulsion cylinder 41 and a tensioner 36 for reducing or eliminating the slack in the cable assembly 43.

In operation, a vehicle 12 is propelled on the tracks 37 by attachment to the cable assembly 32 until it reaches the end of the segment at the propulsion cylinder 30. At this point, the vehicle 12 disengages from the cable assembly 32 and coasts along the tracks 37 until engaging with a cable assembly 43. The vehicle 12 is propelled continuously and seamlessly by the cable assembly 43 until reaching the end of the segment at the propulsion cylinder 41 where it either transitions to the next segment/propulsion assembly or switching to a station track to stop at a load station. In other embodiments, the vehicle 12 may also switch off of the cable assembly 32 at any point along the route.

In an embodiment, the motor 33, and similarly the motor 34, may provide an output power of approximately 1,500 horsepower. The motor 33 is designed to drive the propulsion cylinder 30 at a constant speed of approximately 120 mph. The motor 33 may also include a variable speed drive that allows necessary adjustments of power supplied to the propulsion cylinder 30 as the cylinder 28 wears. Further, the motor 33 may power the propulsion cylinder 30 at slow speed in order to perform maintenance operations to the propulsion assembly 13 or other components.

In this example, each of the propulsion segment assemblies 13 and 14 will typically be propelling two of the vehicles 12 along at some point along the five (5) mile distance of segment assembly (for a total of four vehicles 12). When the high speed rail system 10 is constructed over a steep grade, the propulsion segment assemblies 13 and 14 may be shortened to a distance such as two and a half (2.5) miles each so that the same 1,500 horsepower motor is now propelling only one vehicle 12 over the grade, but still maintaining the desired speed of around 120 mph. In this example, a conventional train system would require a tunnel through or extend the tracks around the grade obstruction, thus significantly increasing the cost of the system. In other examples, the motor size may vary depending upon factors such as the speed of the system and the size of the vehicles being transported.

Referring now to FIG. 4, the cable assembly 32 of FIG. 3 is shown in more detail. In an embodiment, the cable assembly 32 includes four cables (cable 46, cable 48, cable 50 and cable 52) all of which are connected to and powered by the propulsion cylinder 30. The cable support apparatus 53 may also include one or more support bars 55 that are attached to the cables 46, 48, 50 and 52. In an embodiment, the support bars 55 may be spaced every approximately 300 feet along the cables 46, 48, 50 and 52. Each of the support bars 55 are designed to reduce or eliminate frictional wear for the cables 46, 48, 50 and 52. As a result, travel around the propulsion cylinder and the free cylinder provides the only significant friction to the cables 46, 48, 50 and 52. The support bar 55 may have a slider 56 and a slider 57 attached on opposite ends of the support bar 55 to allow the slide in channel guides as shown in FIG. 5.

The cables 46, 48, 50 and 52 may comprise a 0.25 inch diameter cable that comprises steel or other suitable material that is strong and flexible. In general, the propulsion cylinder 30 the cables 46, 48, 50 and 52 are sized for minimal wear on each, where the ratio for the diameter of the propulsion cylinder 30 to each of the diameters of the cables 46, 48, 50 and 52 is at least approximately one hundred to one (100:1). In other embodiments, the cables 46, 48, 50 and 52 may comprise belts or chains, and size of the cables may vary depending upon factors such as the speed of the system and the size of the vehicles being transported.

FIGS. 5A-B show rear and side cutaway views, respectively, of a support structure 60 for a cable support apparatus 61 in accordance with an embodiment. Generally, the support structure is designed to support rail tracks 58 and any passing vehicles 12, and includes an opening 78. The opening 78 is designed to contain a cable assembly 63 and cable support apparatuses 59 and 61. In an embodiment, opening 78 may have a width X of around three feet and a depth Y of around four feet. In an embodiment, the support structure comprises concrete or other suitable material. In this embodiment, the rails 58 are located on top of the support structure 60 and may be secured in place by various means.

The cable support apparatus 59 includes a support bar 71 that is attached to cables 65, 66, 68 and 69. In an embodiment, each of the cables 65, 66, 68 and 69 comprise a loop that is oriented in a substantially vertical direction. The support bar 71 is substantially similar to the support bar 55 and the cables 65, 66, 68 and 69 are substantially similar to the cables 46, 48, 50 and 52.

The support bar 71 is also attached to a slider 67 and a slider 70 on opposite ends of the bar 71. A left channel guide 73 and a right channel guide 75 are attached to support structure 60. In an embodiment, the left channel guide 73 and the right channel guide 75 are C-shaped such that slider 67 and the slider 70 are designed to fit slidably within the guides 73 and 75. The opening may also include a support structure 84 similar in function to a rail tie. A spacer 84 may provide separation and support between the looping cables 65, 66, 68 and 69 of the cable assembly 63.

A support bar 72 is attached to the cables 65, 66, 68 and 69, and is substantially similar to the support bar 71. Further, the cable support apparatus 61 is substantially similar to the cable support apparatus 59; a left channel guide 73 and a right channel guide 75 are substantially similar to the left channel guide 62 and the right channel guide 64, respectively; and a slider 77 and a slide 80 are substantially similar to the sliders 67 and 70.

In an embodiment, the sliders 67, 70, 77 and 80 and the channel guides 62, 64, 73 and 75 may comprise an ultra-high molecular weight polyethylene material. In another embodiment the sliders 67, 70, 77 and 80 and the channel guides 62, 64, 73 and 75 may include ceramic bearings, steel or some other material or structure that allows low friction sliding. In other embodiments, the sliders 67, 70, 77 and 80 may comprise wheels and the channel guides 62, 64, 73 and 75 may comprise rails.

FIG. 6 shows a side cutaway view of a vehicle connector assembly 86 and a cable support apparatus 88 in accordance with an embodiment. The vehicle connector assembly 86 may include an L-shaped connecting arm 93 having a first end 94 that is movably connected to the vehicle 12 and having second end 95 that is connected to a connecting head 96. The cable support apparatus 88 may include a support bar 98 that is substantially similar to support bars 71 and is attached to a cable assembly 102. A vehicle connecting hook 100 may be C-shaped such that the lower end of the hook 100 is fixedly attached to the support bar 98.

In an embodiment, the vehicle connector assembly 88 may include an actuator 97 that is connected to the first end 94 of the L-shaped connecting arm 93. The actuator 97 is controlled by an electronic control system 101 and may comprise a hydraulic, a pneumatic or an electric actuator.

In operation, the vehicle connector assembly 86 is designed to move selectively between Position A and Position B. When the vehicle connector assembly 86 is selectively positioned at a substantially horizontal position at Position A, the assembly 86 is not connected to the cable support apparatus 88. As a result, the cable support apparatus 88 is not providing any propulsion power to the vehicle 12, which then may coast or employ an internal source of power located onboard the vehicle 12.

When the vehicle connector assembly 86 is selectively positioned at a substantially vertical position at Position B, the assembly 86 may connect to the cable support apparatus 88 when the connecting head 96 engages frictionally the C-shaped vehicle connecting hook 100. As a result, the cable support apparatus 88 may provide propulsion power to the vehicle 12 when connected at the same speed without substantial shock load from sudden accelerations.

Referring now to FIG. 7, a rear cutaway view of a vehicle connector assembly 172 is shown in accordance with another embodiment. Vehicle connector assembly 172 may include a connecting arm 176 connected to a cable gripping apparatus 180. A fluid reservoir 178 may be connected to the vehicle connector assembly 172 for selectively providing a hydraulic fluid to the cable gripping apparatus 180 through a fluid line 212. The cable gripping apparatus 180 may include a series of four pairs of grippers such as left gripper 192 and right gripper 194, which are substantially similar to left gripper 197 and right gripper 200, left gripper 203 and right gripper 205, and left gripper 207 and right gripper 209, respectively. Left gripper 192 and right gripper 194 are designed to selectively close in order to engage frictionally cable 183, which along with cable 185, cable 188 and cable 190, are components of cable assembly 182.

FIG. 8 is a side cutaway view of the vehicle connector assembly 172 of FIG. 7 in further detail regarding when the assembly is moved between a Position C and a Position D. The connecting arm 176 may include a rotating connector 184 having an opening 186 located at one end. The rotating connector 184 may be connected rotatably to a support assembly on the vehicle 12. When the cable gripping apparatus 180 is raised to Position C, the vehicle will coast or employ onboard power. When the cable gripping apparatus 180 is lowered to Position D, the left gripper 192 and the right gripper 194 are positioned on opposite sides of the cable 183 in order to engage the cable 183. Similarly, the other gripper pairs 197/200, 203/205 and 207/209 are positioned around and selectively frictionally engage the respective corresponding cables 185, 188 and 190 and provide propulsion to the vehicle 12.

Referring now to FIG. 9, a top diagrammatic view of multiple stations is shown in accordance with an embodiment of the transportation system of FIG. 1. Each of the stations 105, 107 and 110 are connected by station tracks to mainline tracks 167 and 170. As shown in this example, vehicles 12 travel at high speeds on mainline track 167 in a southbound direction and at high speeds on mainline track 170 in a northbound direction. On the mainline tracks 167 and 170, the vehicles 12 are being propelled by a high speed propulsion segment assembly 13 such as shown in FIG. 1. Any vehicles 12 on the southbound mainline track 167 can operate independently from other vehicles 12 on the southbound mainline track 167 as well as from any vehicles that are operating on the northbound mainline track 170.

A vehicle 12 that is traveling southbound on mainline track 167 and is programmed to stop at station 105 would exit the mainline track 167 at track point 112. The vehicle 12 would coast on a coasting/accelerating track to track point 114 and switch tracks to a station track and proceed to track point 115 located at the station 105. The vehicle 12 could travel by coasting a total distance of up to around two miles from the mainline track 167 to station 105.

Station 105 may be the same, higher or lower in elevation than the coasting/accelerating track at track point 114. Further, while mainline tracks includes a high speed propulsion segment assembly, coasting/accelerating tracks may include a separate vehicle accelerating propulsion system that may accelerate a vehicle 12 from zero mph up to around 125 mph in order to seamlessly couple with a mainline vehicle propulsion system. For example, the segments from track point 133 to track point 137 and from track point 163 to 165 may each include a vehicle accelerating propulsion system.

All of the tracks (i.e., rails) themselves are substantially identical in structure but are identified as either mainline, coasting/accelerating or station in order to more clearly describe how the vehicle is being propelled (e.g., coasting/accelerating) or the vehicle's location (e.g., near a station).

At station 105, passengers and cargo may be loaded and unloaded. When ready to proceed, the vehicle 12 leaves the station 105 and accelerates on the coasting/accelerating track towards track point 117 under the small onboard motor 39 until switching onto the vehicle accelerating propulsion system on a coasting/accelerating track at track point 153. The vehicle 12 may continue to accelerate to mainline speed, switching back onto the mainline track 167 at track point 137, and proceeding to its next station.

Similarly, a vehicle 12 that is traveling southbound on mainline track 167 and is programmed to stop at station 107 would also exit the mainline track 167 at track point 112. The vehicle 12 would coast on a coasting/accelerating track to track point 120 and switch to a station track and proceed to track point 122 located at the station 107. The vehicle could travel by coasting a total distance of up to around two miles from the mainline track 167 to station 107. In an embodiment, the vehicle may employ regenerative braking in order to generate and store power for reuse.

At station 107, passengers and cargo may be loaded and unloaded. When ready to proceed, the vehicle 12 leaves the station 107 and accelerates on the coasting/accelerating track towards track point 127 under the small onboard motor 39 until switching onto the vehicle accelerating propulsion system on a coasting/accelerating track at track point 127. The vehicle 12 may continue to accelerate to mainline speed, switching back onto the mainline track 167 at track point 137, and proceeding to its next station.

Similarly, a vehicle 12 that is traveling southbound on mainline track 167 and is programmed to stop at station 110 would also exit the mainline track 167 at track point 112. The vehicle 12 would coast on a coasting/accelerating track to track point 135 and switch tracks to a station track and proceed to track point 130 located at the station 107. The vehicle could travel by coasting a total distance of up to around two miles from the mainline track 167 to station 110.

At station 110, passengers and cargo may be loaded and unloaded. When ready to proceed, the vehicle 12 leaves the station 110 and accelerates on the coasting/accelerating track towards track point 133 under the small onboard motor 39 until switching onto the vehicle accelerating propulsion system on a coasting/accelerating track at track point 133. The vehicle 12 may continue to accelerate to mainline speed, switching back onto the mainline track 167 at track point 137, and proceeding to its next station.

A vehicle 12 that is traveling northbound on mainline track 170 and is programmed to stop at station 110 would exit the mainline track 170 at track point 140. The vehicle 12 would coast on a coasting/accelerating track to track point 142 and switch tracks to a station track and proceed to track point 145 located at the station 110. The vehicle 12 could travel by coasting a total distance of up to around two miles from the mainline track 170 to station 110.

At station 110, passengers and cargo may be loaded and unloaded. When ready to proceed, the vehicle 12 leaves the station 110 and accelerates on the coasting/accelerating track towards track point 147 under the small onboard motor 39 until switching onto the vehicle accelerating propulsion system on a coasting/accelerating track at track point 147. The vehicle 12 may continue to accelerate until switching back onto the mainline track 170 at track point 165 and proceeding to its next station. The vehicle 12 may continue to accelerate to mainline speed, switching back onto the mainline track 170 at track point 165, and proceeding to its next station.

Similarly, a vehicle 12 that is traveling northbound on mainline track 170 and is programmed to stop at station 107 would also exit the mainline track 170 at track point 140. The vehicle 12 would coast on a coasting/accelerating track to track point 150 and switch tracks to a station track and proceed to track point 125 located at the station 107. The vehicle could travel by coasting a total distance of up to around two miles from the mainline track 170 to station 107.

At station 107, passengers and cargo may be loaded and unloaded. When ready to proceed, the vehicle 12 leaves the station 107 and accelerates on the coasting/accelerating track towards track point 155 under the small onboard motor 39 until switching onto the vehicle accelerating propulsion system on a coasting/accelerating track at track point 155. The vehicle 12 may continue to accelerate to mainline speed, switching back onto the mainline track 170 at track point 165, and proceeding to its next station.

Similarly, a vehicle 12 that is traveling northbound on mainline 170 and is programmed to stop at station 105 would also exit the mainline track 170 at track point 140. The vehicle 12 would coast on a coasting/accelerating track to track point 158 and switch tracks to a station track and proceed to track point 160 located at the station 105. The vehicle could travel by coasting a total distance of up to around two miles from the mainline track 170 to station 105.

At station 105, passengers and cargo may be loaded and unloaded. When ready to proceed, the vehicle 12 leaves the station 105 and accelerates on the coasting/accelerating track towards track point 163 under the small onboard motor 39 until switching onto the vehicle accelerating propulsion system on a coasting/accelerating track at track point 163. The vehicle 12 may continue to accelerate to mainline speed, switching back onto the mainline track 170 at track point 165, and proceeding to its next station.

In this embodiment, there are sections of track where a vehicle 12 may be coasting or accelerating depending upon which station the vehicle 12 is proceeding towards or away from. For example, the section of southbound coasting/accelerating track section from track point 153 to track point 135 may be used as a coasting track for vehicles 12 that are traveling to station 110. The same section of southbound coasting/accelerating track from track point 153 to track point 135 may be used as an accelerating track for vehicles 12 that are traveling from station 105 and back to the mainline 167. The vehicle accelerating propulsion system would not engage a vehicle 12 that is traveling from track point 153 to track point 135 as the vehicle 12 is coasting to station 110, but would engage the vehicle 12 that is departing from station 105 and traveling back to the mainline track 167.

Similarly, the section of northbound coasting/accelerating track from track point 147 to track point 158 may be used as a coasting track for vehicles 12 that are traveling to station 105. The same section of northbound coasting/accelerating track from track point 147 to track point 158 may be used as an accelerating track for vehicles 12 that are traveling from station 110 and back to the mainline 170.

Figure 10:
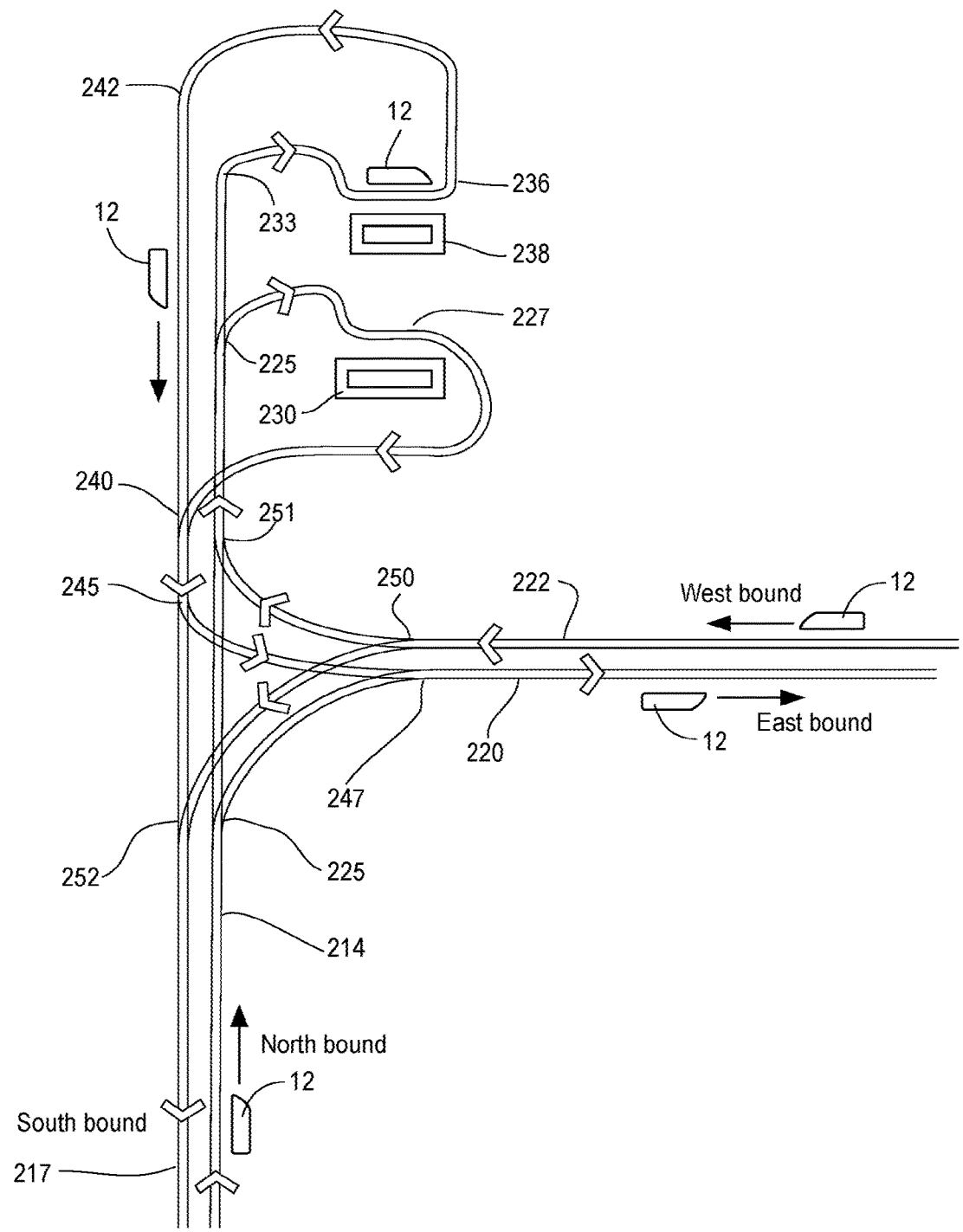
FIG. 10 is a top diagrammatic view of multiple stations and tracks in accordance with another embodiment of the transportation system of FIG. 1.

Referring now to FIG. 10, a top diagrammatic view of multiple stations and tracks is shown in accordance with another embodiment of the transportation system of FIG. 1. Each of the stations 230 and 238 are connected by coasting/accelerating tracks to mainline tracks 214, 217, 220 and 222. As shown in this example, vehicles 12 travel at high speeds on mainline track 214 in a northbound direction and at high speeds on mainline track 217 in a southbound direction. In addition, vehicles 12 travel at high speeds on mainline track 220 in an eastbound direction and at high speeds on mainline track 222 in a westbound direction.

In this embodiment, a vehicle 12 that is traveling northbound on mainline track 214 is programmed to stop at station 230 and then return by traveling southbound on mainline track 217. While traveling northbound, the vehicle 12 would exit the northbound mainline track 214 at track point 225 and coast on a coasting/accelerating track to track point 227 located at the station 230. At station 230, passengers and cargo may be loaded and unloaded. When ready to proceed southbound, the vehicle 12 leaves the station 230 and accelerates on the coasting/accelerating track towards track point 240 to switch back onto the southbound mainline track 217.

Similarly, a vehicle 12 that is traveling northbound on mainline track 214 is programmed to stop at station 238 and then return by traveling southbound on mainline track 217. While traveling northbound, the vehicle 12 would exit the northbound mainline track 214 at track point 233 and coast on a coasting/accelerating track to track point 236 located at the station 238. At station 238, passengers and cargo may be loaded and unloaded. When ready to proceed southbound, the vehicle 12 leaves the station 238 and accelerates on the coasting/accelerating track towards track point 242 to switch back onto the southbound mainline track 217.

A vehicle 12 that is proceeding northbound on mainline track 214 may switch onto a coasting/accelerating track at track point 225 and coast to the eastbound mainline track 220 at track point 247. If the northbound mainline track 214 and the eastbound mainline track 220 are in close proximity to each other, the vehicle 12 may engage a high speed propulsion segment assembly 13 located on eastbound mainline track 220 with minimal speed differential. In another embodiment for greater distances, a high speed propulsion assembly may be located between track point 225 and track point 247 to propel the vehicle 12 from the northbound mainline track 214 to the eastbound mainline track 220.

Similarly, a vehicle 12 that is proceeding southbound on mainline track 217 may switch onto a coasting/accelerating track at track point 245 and coast to the eastbound mainline track 220 at track point 247. Because the southbound mainline track 217 and the eastbound mainline track 220 are in close proximity to each other, the vehicle 12 may engage a high speed propulsion segment assembly 13 located on eastbound mainline track 220 with minimal speed differential. In another embodiment for greater distances, if a high speed propulsion assembly may be located between track point 245 and track point 247 to propel the vehicle 12 from the southbound mainline track 217 to the eastbound mainline track 220.

Similarly, a vehicle 12 that is proceeding westbound on mainline track 222 may switch onto a coasting/accelerating track at track point 250 and coast to the southbound mainline track 217 at track point 252. Because the westbound mainline track 222 and the southbound mainline track 217 are in close proximity to each other, the vehicle 12 may engage a high speed propulsion segment assembly 13 located on southbound mainline track 217 with minimal speed differential. In another embodiment for greater distances, if a high speed propulsion assembly may be located between track point 222 and track point 252 to propel the vehicle 12 from the westbound mainline track 222 to the southbound mainline track 217.

And likewise, a vehicle 12 that is proceeding westbound on mainline track 222 may switch onto a coasting/accelerating track at track point 250 and coast to the northbound mainline track 214 at track point 251. Because the westbound mainline track 222 and the northbound mainline track 214 are in close proximity to each other, the vehicle 12 may engage a high speed propulsion segment assembly 13 located on northbound mainline track 214 with minimal speed differential. In another embodiment for greater distances, a high speed propulsion assembly may be located between track point 250 and track point 251 to propel the vehicle 12 from the westbound mainline track 214 to the northbound mainline track 214.

Figure 12A:
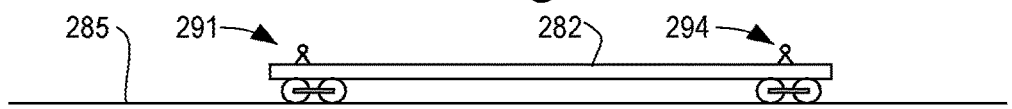
FIG. 12A is a side view of the cargo transport vehicle of FIGS. 11A-B.

Referring now to FIGS. 11A-B and FIGS. 12A-C, FIG. 11A is a top view and FIG. 11B is a side view of a road vehicle loading system 255 in an embodiment of the transportation system of FIG. 1. FIG. 12A is a side view of the cargo transport vehicle of FIGS. 11A-B, and FIGS. 12B-C are side views of the road vehicle transport platform of FIGS. 11A-B. The high speed loading system 255 may include a transport platform advancing system 268 for moving a series of road vehicle transport platforms 257, 260 and 262 over transport platform rails 264 and 266 to couple with a cargo transport vehicle 282. Each of the road vehicles 273 and 275 may comprise an automobile, a van, a truck or any other vehicle that may be transported on the road vehicle transport platform 257 on the high speed transportation system 10.

Road vehicle 273 is shown on a loading ramp 277 and has been driven under its own power onto the loading ramp 277 before proceeding onto the road vehicle transport platform 257. The transport advancing system 268 may include a platform advancing apparatus 272, a platform advancing screw 315 and rails 264 and 266. In operation, the platform advancing system 268 propels the road vehicle transport platform 257 along the rails 264 and 266.

In an embodiment, the platform advancing apparatus 272 may include a platform advancing screw 315, a pair of platform advancing bolts 317 and 319, a header 322, a pair of platform guide 324 and 326, and a rail support 328. In operation, as the screw 315 is turned, the bolts 317 and 319 advance along the screw 315 and the header 322 towards or away from a rail vehicle platform support assembly 291 located in between coasting/accelerating tracks 285 and 287. In this way, the header 322 may push or pull a road vehicle transport platform 296 onto the cargo transport vehicle 282 having the rail vehicle platform support assemblies 291 and 294. In other embodiments the platform advancing apparatus 272 may comprise a hydraulic or electrical system for moving the road vehicle transport platform 296.

Figure 12B:
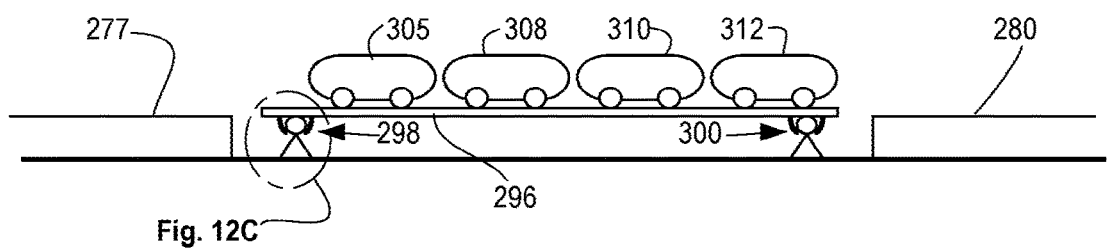
FIG. 12B is a side view of the road vehicle transport platform of FIGS. 11A-B.
Figure 12C:
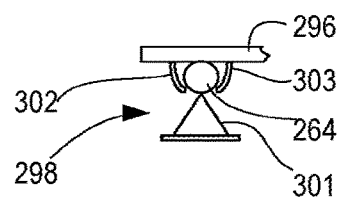
FIG. 12C is another side view of the road vehicle transport platform of FIGS. 11A-B.

Another road vehicle transport platform 296 is shown in FIGS. 12A-C as being supported by ground platform support assemblies 298 and 300. The ground platform support assembly 298 may include rail supports 301 supporting a rail 264. The rail 264 is partially enclosed and guided by platform guides 302 and 303. In operation in a loading mode, once a road vehicle transport platform 296 is loaded with road vehicles 305, 308, 310 and 312, the road vehicle transport platform 296 may be propelled onto a rail car 282 having a pair of rail vehicle platform support assemblies 291 and 294. The rail car 282 may then proceed and accelerate on the coasting/accelerating track 287 until transitioning to a mainline track 289.

The road vehicle loading system 255 may also operate in an unloading mode. In this mode, the cargo transport vehicle 282 may be transporting a road vehicle transport platform 296 that is transporting several road vehicles 305, 308, 310 and 312, may exit the mainline track 289 and coast on coasting/accelerating track 285 until reaching the road vehicle loading system 255. There, the transport platform advancing system 268 operates to the pull road vehicle transport platform 296 off the cargo transport vehicle 282 and propel the road vehicle transport platform 296 until being aligned with an unloading ramp 280. The road vehicles 305, 308, 310 and 312 may be off-loaded from the road vehicle transport platform 296 onto the loading ramp 280, where the vehicles may proceed independently under each vehicle's power to a destination such as a home or office. In operation, the road vehicles 305, 308, 310 and 312 may be controlled and moved by the individual driver of each vehicle.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A rail transportation system for moving a vehicle along a continuous track, comprising:
    a plurality of adjacent propulsion segment assemblies, each of which provides propulsion along a segment of said track; and
    a vehicle for traveling along said continuous track,
    wherein at least one of said propulsion segment assemblies comprises a propulsion cylinder, a free cylinder, and a cable assembly movably connected to the propulsion cylinder and the free cylinder,
    wherein the cable assembly of at least one of said propulsion segment assemblies comprises a cable support apparatus, and
    wherein the cable support apparatus comprises a support bar and at least one slider.

2. The rail transportation system of claim 1, wherein the propulsion cylinder of at least one of said propulsion segment assemblies comprises an electric motor.

3. The rail transportation system of claim 1, wherein at least one of said propulsion segment assemblies further comprises a cable tensioner.

4. The rail transportation system of claim 1, wherein the cable assembly of at least one of said propulsion segment assemblies further comprises at least one cable.

5. The rail transportation system of claim 1, wherein the vehicle comprises a vehicle connector assembly comprising a movable connecting arm.

6. The rail transportation system of claim 5, wherein the movable connecting arm comprises a vehicle connecting hook.

7. The rail transportation system of claim 6, wherein the vehicle connecting hook is configured to:
    selectively engage a first of said propulsion segment assemblies,
    selectively disengage the first of said propulsion segment assemblies, and
    selectively engage a second of said propulsion segment assemblies.

8. The rail transportation system of claim 5, wherein the movable connecting arm comprises a gripping apparatus.

9. The rail transportation system of claim 8, wherein the gripping apparatus is configured to:
    selectively frictionally engage a first of said propulsion segment assemblies,
    selectively disengage the first of said propulsion segment assemblies, and
    selectively frictionally engage a second of said propulsion segment assemblies.

10. The rail transportation system of claim 9, wherein the gripping apparatus is configured to frictionally engage each of said propulsion segment assemblies with a variable amount of force.

11. The rail transportation system of claim 9, wherein the gripping apparatus is configured to frictionally engage each of said propulsion segment assemblies with a progressively increasing amount of force.

12. The rail transportation system of claim 1, wherein the vehicle further comprises an electrical generator.

13. The rail transportation system of claim 1, wherein the vehicle further comprises a rail car.

14. The rail transportation system of claim 1, wherein the vehicle further comprises a cargo transport vehicle.

15. The rail transportation system of claim 14, further comprising a load station.

16. The rail transportation system of claim 15, wherein the load station further comprises a transport platform advancing system for moving a road vehicle transport platform to couple with the cargo transport vehicle.

17. The rail transportation system of claim 1, wherein the slider comprises a plain bearing.

18. The rail transportation system of claim 1, wherein the slider comprises a rolling-element bearing.

19. A rail transportation system for moving a vehicle along a continuous track, comprising:
    a plurality of adjacent propulsion segment assemblies, each of which provides propulsion along a segment of said track; and
    a vehicle for traveling along said continuous track,
    wherein at least one of said propulsion segment assemblies comprises a propulsion cylinder, a free cylinder, and a cable assembly movably connected to the propulsion cylinder and the free cylinder,
    wherein the cable assembly of at least one of said propulsion segment assemblies comprises a cable support apparatus,
    wherein the cable support apparatus comprises a support bar and at least one slider,
    wherein the vehicle comprises a vehicle connector assembly comprising a movable cable gripping apparatus, and
    wherein the cable gripping apparatus is configured to selectively frictionally engage the cable assembly of a first of said propulsion segment assemblies,
    selectively disengage the cable assembly of the first of said propulsion segment assemblies, and
    selectively frictionally engage the cable assembly of a second of said propulsion segment assemblies.

20. A method for constructing a rail transportation system comprising the steps of:
    constructing a support structure comprising a top surface, a first side wall, and a second side wall;
    placing one or more rails upon the top surface;
    affixing a channel guide to either the first side wall or the second side wall;
    installing a support bar and at least one slider in the channel guide; and
    affixing one or more cables to the support bar.

* * * * *